United States Patent
Murakami et al.

(10) Patent No.: US 8,104,567 B2
(45) Date of Patent: Jan. 31, 2012

(54) VEHICLE STEERING APPARATUS

(75) Inventors: Tetsuya Murakami, Nara (JP); Isamu Shindou, Kashihara (JP); Kazuaki Nagamatsu, Lyons (FR)

(73) Assignee: Jtekt Corporation, Osaka-Shi (JP)

( * ) Notice: Subject to any disclaimer, the term of this patent is extended or adjusted under 35 U.S.C. 154(b) by 503 days.

(21) Appl. No.: 10/581,193

(22) PCT Filed: Nov. 30, 2004

(86) PCT No.: PCT/JP2004/017766
§ 371 (c)(1),
(2), (4) Date: Jun. 1, 2006

(87) PCT Pub. No.: WO2005/054036
PCT Pub. Date: Jun. 16, 2005

(65) Prior Publication Data
US 2007/0102229 A1    May 10, 2007

(30) Foreign Application Priority Data
Dec. 4, 2003  (JP) ................. 2003-405778

(51) Int. Cl.
*B62D 5/04* (2006.01)
(52) U.S. Cl. ........................ 180/444; 180/443
(58) Field of Classification Search ............ 180/443, 180/444
See application file for complete search history.

(56) References Cited

U.S. PATENT DOCUMENTS

| | | | |
|---|---|---|---|
| 5,971,094 A | 10/1999 | Joshita | |
| 6,155,376 A * | 12/2000 | Cheng | 180/444 |
| 6,186,268 B1 * | 2/2001 | Onodera et al. | 180/444 |
| 6,427,799 B1 * | 8/2002 | Kodaira | 180/444 |
| 6,644,432 B1 * | 11/2003 | Yost et al. | 180/444 |
| 7,172,051 B2 * | 2/2007 | Nagamatsu et al. | 180/444 |
| 2003/0000766 A1 * | 1/2003 | Tatewaki et al. | 180/444 |
| 2003/0047374 A1 * | 3/2003 | Peppler et al. | 180/446 |
| 2003/0188918 A1 | 10/2003 | Shimizu et al. | |
| 2004/0069559 A1 * | 4/2004 | Iwasa et al. | 180/443 |
| 2004/0206199 A1 * | 10/2004 | Nagamatsu et al. | 74/499 |
| 2004/0238263 A1 * | 12/2004 | Saruwatari | 180/444 |

FOREIGN PATENT DOCUMENTS

| | | |
|---|---|---|
| EP | 1 043 210 A1 | 10/2000 |
| FR | 2 853 877 | 10/2004 |
| JP | 60 237217 | 11/1985 |
| JP | 6-25078 U | 4/1994 |
| JP | 10-7005 A | 1/1998 |

(Continued)

*Primary Examiner* — Tony H. Winner
*Assistant Examiner* — Jacob Knutson
(74) *Attorney, Agent, or Firm* — Birch, Stewart, Kolasch & Birch, LLP

(57) ABSTRACT

In a vehicle steering apparatus in which a housing for supporting coaxially to a rack shaft a ball nut that is provided with a ball screw mechanism constructed between itself and the rack shaft for moving in an axial direction for the purpose of steering and that is rotated by transmission from a steering motor is constructed in a separated form consisting of first and second housings fit to each other by spigot-joint fitting on an outer side of a retaining ring of a thrust bearing for thrust-supporting a rotating cylinder, a gap is provided in a part of the spigot-joint fitting part located on an outer side of the fixing nut screwed into the retaining ring in order to apply from one side a tightening force on a thrust bearing fit into and retained by the retaining ring.

8 Claims, 3 Drawing Sheets

FOREIGN PATENT DOCUMENTS

| | | |
|---|---|---|
| JP | 10-129511 A | 5/1998 |
| JP | 2000-168581 A | 6/2000 |
| JP | 2000-280921 A | 10/2000 |
| JP | 2000-280923 A | 10/2000 |
| JP | 2001-95432 A | 4/2001 |
| JP | 2001-187955 A | 7/2001 |
| JP | 2002 274397 | 9/2002 |
| JP | 2003-252212 A | 9/2003 |
| JP | 2003-291830 A | 10/2003 |
| WO | WO-00/26077 A | 5/2000 |

* cited by examiner

VEHICLE STEERING APPARATUS

This application is the national phase under 35 U.S.C. §371 of PCT International Application No. PCT/JP2004/017766 which has an International filing date of Nov. 30, 2004 and designated the United States of America.

TECHNICAL FIELD

The present invention relates to a vehicle steering apparatus in which rotation of a steering motor driven in accordance with an operation of a steering member is motion-converted and then transmitted to a steering shaft in a steering mechanism so that the steering shaft moves in an axial direction and thereby achieves steering.

BACKGROUND ART

Steering of a vehicle is achieved in such a manner that an operation of a steering member (in general, an operation of rotating a steering wheel) performed by a driver is transmitted to a steering shaft in a steering mechanism so that the operation of the steering shaft steers wheels for steering (in general, right and left front wheels).

As a vehicle steering apparatus for performing such steering, an electric power steering apparatus is practically realized in which a steering motor is attached to a steering mechanism linked mechanically to a steering member so that a torque of the steering motor driven in accordance with an operation of the steering member is transmitted to a steering shaft in the steering mechanism and thereby assists the steering performed by mechanical transmission from the steering member to the steering shaft. Further, on the other hand, a separate type steering apparatus, that is, a steering apparatus of so-called steering-by-wire type, is under development in which a steering motor is attached to a steering mechanism separated mechanically from a steering member so that a torque of the steering motor driven in accordance with an operation of the steering member is solely transmitted to a steering shaft in the steering mechanism and thereby achieves steering.

In many cases, the steering mechanism of a vehicle is provided with a steering shaft extending to the right and left of the vehicle and moving in the axial direction so that the displacement of the steering shaft is transmitted to wheels for steering (in general, right and left front wheels) linked to both ends and thereby achieves steering. When a steering motor is attached to such a steering mechanism, in the inside of a housing for supporting the steering shaft, a rotating cylinder is supported in a freely rotatable manner coaxially to the steering shaft. Then, a screw mechanism such as a ball screw mechanism is constructed between the rotating cylinder and the steering shaft, so that rotation of the steering motor is transmitted to the rotating cylinder via a gear transmission unit employing spur gears, bevel gears, and the like. Then, the rotation of the rotating cylinder is motion-converted by said screw mechanism and then transmitted to the steering shaft, so that the steering shaft is moved in the axial direction (see, for example, Japanese Patent Application Laid-Open No. 2003-252212).

DISCLOSURE OF THE INVENTION

Here, in a vehicle steering apparatus having the above-mentioned configuration, the rotating cylinder inside the housing receives a large thrust force in association with the motion conversion by the screw mechanism. Thus, at least on one side of the axial direction, the rotating cylinder is supported by a thrust bearing such as an angular contact ball bearing. Nevertheless, in order that a desired thrust load capability should be obtained in this supporting part, a predetermined pre-load need be imparted to the thrust bearing while the thrust-bearing need be fixed firmly inside the housing in a manner unmovable in the axial direction.

Thus, in the vehicle steering apparatus disclosed in Japanese Patent Application Laid-Open No. 2003-252212, a fixing structure is adopted that the housing for supporting the rotating cylinder is constructed in a separated form consisting of first and second housings fit to each other by spigot-joint fitting on the outer side of the retaining part of the thrust bearing for supporting one side of the rotating cylinder, and that a fixing nut is screwed into a screw groove provided in the inner surface of said retaining part, thereby tightens one side of the thrust bearing, and thereby presses the other side against an end face of the retaining part, so that the thrust bearing is pinched and retained.

Nevertheless, in this configuration, a reaction force associated with the tightening of the thrust bearing acts on the fixing nut. Then, the tightening reaction force acts on the retaining part via the screw groove. Thus, the retaining part expands outward in the radial direction and thereby causes an increase in the diameter of the spigot-joint fitting part in the outer periphery. This has caused a problem that a difficulty arises in the integration of the first and the second housings performed after the attaching of the thrust bearing.

In order that this problem should be resolved, a countermeasure is effective that a sufficient thickness is ensured in the retaining part so that the increase is prevented in the diameter of the spigot-joint fitting part caused by the tightening reaction force of the fixing nut. Nevertheless, this causes an increase in the outer diameter of the housing. Another countermeasure is also effective that the screwing part of the fixing nut provided in the inner side of the retaining part is set up at a position offset from the spigot-joint fitting part toward the inner far side of the axial direction. Nevertheless, this causes an increase in the necessary length of the housing for arranging the fixing nut and the thrust bearing located on the more inner far side than the fixing nut. That is, these countermeasures affect the outer shape of the housing, and hence not preferable for a vehicle steering apparatus where the arrangement space is limited.

The present invention has been devised in view of this situation. An object of the present invention is to provide a vehicle steering apparatus in which a small improvement in the retaining part of the thrust bearing for supporting the rotating cylinder achieves a desired thrust load capability without affecting the outer shape of the housing so that steering operation by transmission from the steering motor is performed stably.

The vehicle steering apparatus according to a first aspect of the present invention is characterized by a vehicle steering apparatus in which a housing for supporting coaxially to a steering shaft a rotating cylinder that is provided with a screw mechanism constructed between itself and said steering shaft for moving in an axial direction for the purpose of steering and that is rotated by transmission from a steering motor is constructed in a separated form consisting of first and second housings fit to each other by spigot-joint fitting on an outer side of a retaining part of a thrust bearing for thrust-supporting said rotating cylinder, wherein a gap is provided in a part that constitutes a part of the spigot-joint fitting part of said first and second housings and that is located on an outer side of a fixing nut screwed into said retaining part in order to apply a tightening force on said thrust bearing from one side.

In the present invention, a gap is provided in a part of the spigot-joint fitting part provided on the outer side of the retaining part of the thrust bearing for supporting the rotating cylinder, so that an increase in the outer diameter of the retaining part caused when the fixing nut is tightened in the inner side of the part where this gap is provided should be absorbed within the range of said gap. This avoids a problem in the integration of the first and the second housings by spigot-joint fitting. Further, a predetermined thrust load capability is ensured by sufficient tightening of the fixing nut, so that displacement of the steering shaft in the axial direction is performed stably that is generated by motion conversion of the rotation of the rotating cylinder performed by the screw mechanism.

Further, the vehicle steering apparatus according to a second aspect of the present invention is characterized in that said screw mechanism in the first aspect is a ball screw mechanism constructed by engaging via a large number of balls a screw groove formed in an outer periphery of said steering shaft with a screw groove formed in an inner periphery of said rotating cylinder.

Further, the vehicle steering apparatus according to a third aspect of the present invention is characterized by comprising an escape stopping ring that is in contact with an end face of said fixing nut from an opposite side of said thrust bearing in the first aspect.

Further, the vehicle steering apparatus according to a fourth aspect of the present invention is characterized in that said thrust bearing in the first aspect is a twin angular contact ball bearing having a common outer race tightened by said fixing nut.

Further, the vehicle steering apparatus according to a fifth aspect of the present invention is characterized in that said thrust bearing in the first aspect is a shield bearing provided with a shield member on both sides of rolling elements.

Further, the vehicle steering apparatus according to a sixth aspect of the present invention is characterized in that said rotating cylinder in the first aspect has, in an outer periphery, a gear wheel that engages with a pinion of an output shaft of said steering motor.

Further, the vehicle steering apparatus according to a seventh aspect of the present invention is characterized in that said gear wheel in the sixth aspect has resin gear teeth.

In the vehicle steering apparatus according to the present invention, with maintaining a desired load capability in the thrust bearing for thrust-supporting the rotating cylinder, integration of the first and the second housings by spigot-joint fitting on the outer side of the retaining part of the thrust bearing is achieved with sufficient tightening of the fixing nut of the thrust bearing without affecting the outer shape of the housing, so that steering operation performed by motion conversion of the rotation of the rotating cylinder and transmitting it to the steering shaft is achieved stably. As such, the present invention has outstanding effects.

BEST MODE FOR CARRYING OUT THE INVENTION

Figure 1:
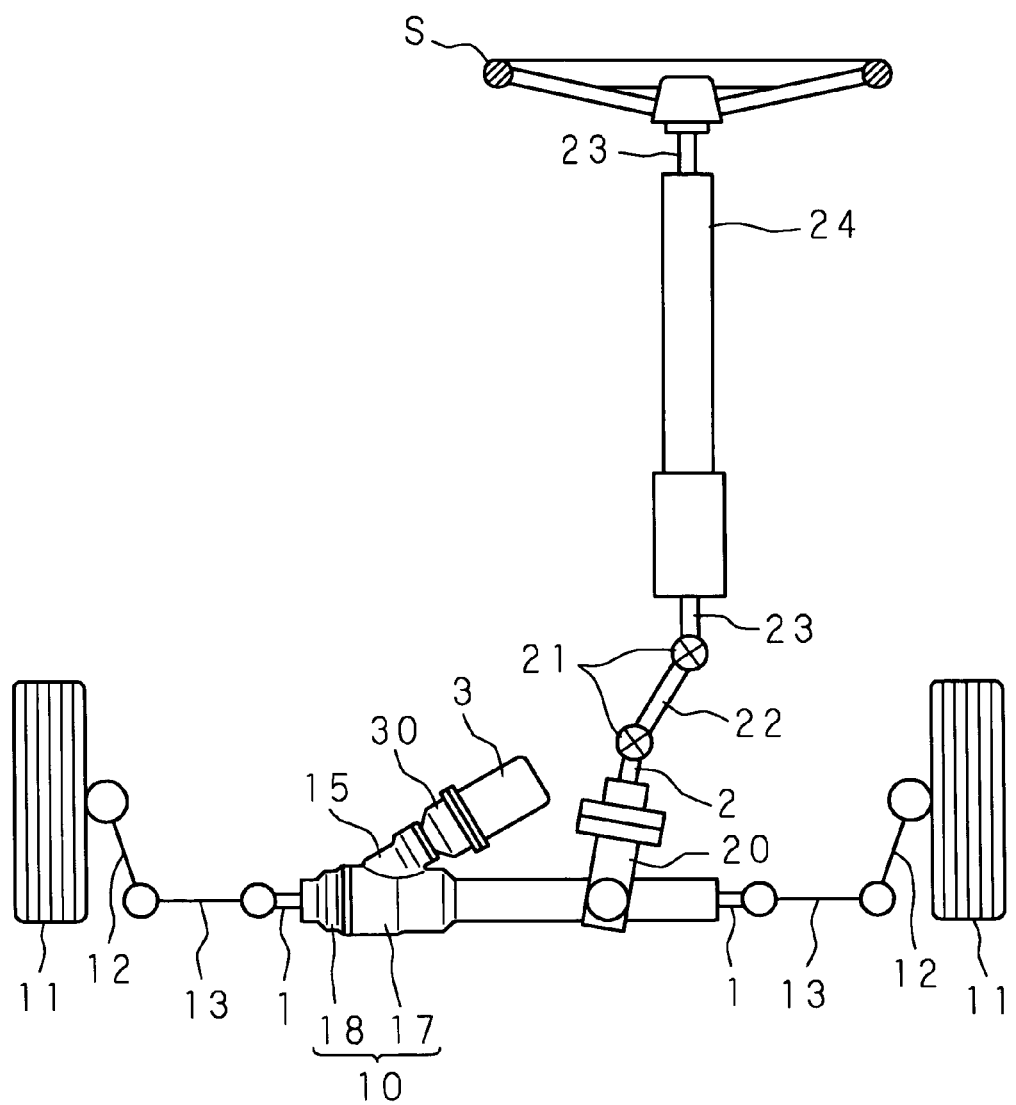
FIG. 1 is a schematic diagram showing the general configuration of a vehicle steering apparatus according to the present invention, which is constructed as an electric power steering apparatus.

The present invention is described below in detail with respect to the drawings that show the embodiment thereof. FIG. 1 is a schematic diagram showing the general configuration of a vehicle steering apparatus according to the present invention. This vehicle steering apparatus is constructed as an electric power steering apparatus comprising: a steering mechanism of rack and pinion type that operates in accordance with a rotation operation of a steering wheel S serving as a steering member; and a steering motor 3 attached to the steering mechanism and driven for steering assistance.

The steering mechanism comprises: a rack housing 10 having a cylindrical shape extending in the right and left direction of a vehicle body (not shown); and a rack shaft (steering shaft) 1 supported inside the rack housing 10 in a manner freely movable in the axial direction. Both ends of the rack shaft 1 protrude to both sides of the rack housing 10, and are then linked respectively via tie rods 13 and 13 to knuckle arms 12 and 12 of right and left front wheels 11 and 11 serving as wheels for steering. Then, when the rack shaft 1 moves in each direction, the knuckle arms 12 and 12 are pushed and pulled via the tie rods 13 and 13 so that the right and the left front wheels 11 and 11 are steered.

In a half part on one side of the rack housing 10, a pinion housing 20 is connected that has an axis intersecting with the axis thereof (the rack housing 10). In the inside of the pinion housing 20, a pinion shaft 2 is supported in a manner freely rotatable about the axis. As for the pinion shaft 2, a protruding part over the pinion housing 20 is solely shown. This protruding part is linked to a column shaft 23 via an intermediate shaft 22 provided with universal joints 21 and 21 at both ends.

In a lower part of the pinion shaft 2 extending inside the pinion housing 20, a pinion (not shown) is provided integrally. Further, in an outer surface of the rack shaft 1 supported inside the rack housing 10, rack teeth (not shown) are formed along an appropriate length covering the intersecting part with the pinion housing 20. These rack teeth engage with said pinion in the lower part of the pinion shaft 2.

The column shaft 23 is supported in a coaxially freely rotatable manner in the inside of a column housing 24 having a cylindrical shape, and is fixed and supported via the column housing 24 in a manner inclined upper-rearward in the inside of a cabin (not shown). The steering wheel S serving as a steering member is fit into and fixed to the top end of the column shaft 23 protruding on top of the column housing 24.

By virtue of the above-mentioned configuration, when a rotation operation of the steering wheel S is performed for steering, the column shaft 23 to which the steering wheel S is fit and fixed rotates about the axis. Then, this rotation is transmitted to the pinion shaft 2 via the intermediate shaft 22. Then, the rotation of the pinion shaft 2 is converted into displacement of the axial direction of the rack shaft 1, in the engage part between said pinion and said rack teeth, so that this displacement steers the right and the left front wheels 11 and 11 as described above.

Figure 2:
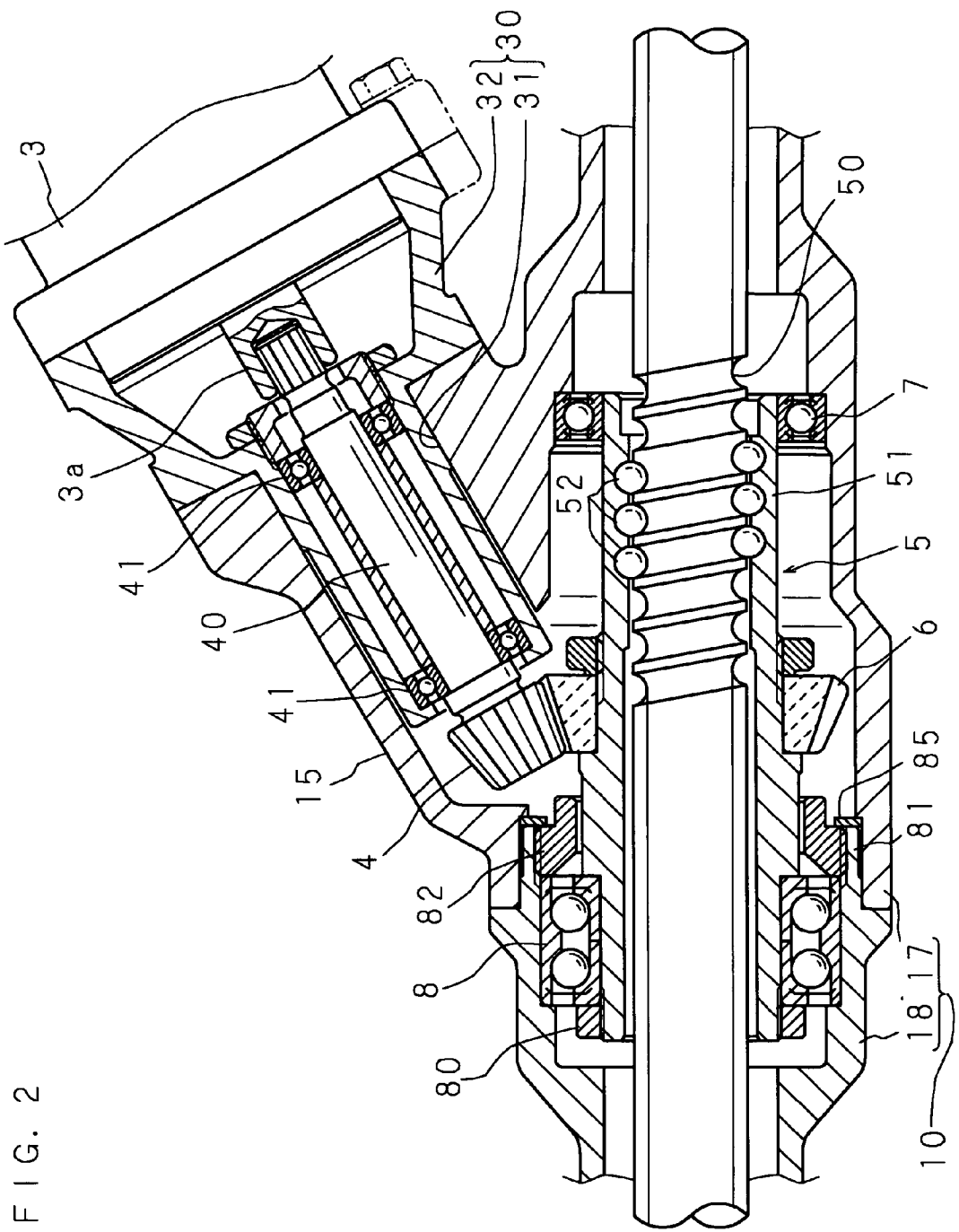
FIG. 2 is a vertical sectional view showing the internal configuration of a rack housing near the attaching position of a steering motor.

The steering motor 3 for assisting such steering is attached to the outer side of the half part on the other side of the rack housing 10. Its transmission configuration in the rack shaft 1 inside the rack housing 10 is as follows. FIG. 2 is a vertical sectional view showing the internal configuration of the rack housing 10 near the attaching position of the steering motor 3.

As shown in the figure, in a middle part of the rack housing 10, a support housing 15 of cylindrical shape is connected that has an axis inclined relative to the rack housing 10 and that protrudes outward. The steering motor 3 is fixed to an end opening of the support housing 15 via a motor housing 30.

The motor housing 30 comprises: a motor support cylinder 32 having a large-diameter cylindrical shape provided, at both ends, with a sitting part of the steering motor 3 and a sitting part to the support housing 15; and a pivotal support cylinder 31 having a small-diameter cylindrical shape connected coaxially to the sitting side to the support housing 15 of the motor support cylinder 32 via a diameter reduction part having a tapered shape. In the inside of the pivotal support cylinder 31, a gear shaft 40 is supported at both ends in a coaxially freely rotatable manner by two bearings 41 and 41 separated in the axial direction.

One end of the gear shaft 40 protrudes from the tip part of the pivotal support cylinder 31. At this protruding end, a small bevel gear 4 serving as a driving gear is formed integrally. The other end of the gear shaft 40 protrudes to the inside of the motor support cylinder 32. This protruding end part is spline-joined to a motor shaft 3a of the steering motor 3 that protrudes into the motor support cylinder 32 from the opposite side.

In the motor housing 30 integrated with the steering motor 3 as described above, the pivotal support cylinder 31 is fit into the support housing 15, and fixed coaxially to the support housing 15. The small bevel gear 4 protruding from the tip of the pivotal support cylinder 31 when fixed as described here is positioned such as to oppose the connection part between the support housing 15 and the rack housing 10 as shown in the figure. Then, the small bevel gear 4 rotates about the axis by transmission from the steering motor 3 performed via the motor shaft 3a and the gear shaft 40.

On the other hand, in an outer periphery surface of the rack shaft 1 supported inside the rack housing 10 in a manner freely movable in the axial direction, a screw groove 50 having a semicircular cross section is formed along an appropriate length in the axial direction on both sides of the connection part with the support housing 15. Further, in the inside of the rack housing 10, a ball nut (rotating cylinder) 51 having a cylindrical shape is supported in a manner freely rotatable coaxially to the rack shaft 1. In an inner periphery surface of the ball nut 51, a screw groove having a semicircular cross section is formed. This screw groove and the screw groove 50 in the outer periphery of the rack shaft 1 engage with each other via a large number of balls 52, 52, . . . , and thereby constitute a ball screw mechanism 5.

The rack housing 10 is constructed in a separated form consisting of a first housing 17 and a second housing 18 linked coaxially on one side of the configuration position of the ball screw mechanism 5 as described above. The ball nut 51 is supported at both ends by a radial bearing 7 fitted into and retained in the first housing 17 including the connection part with the support housing 15 and by a thrust bearing 8 fit into and retained in the connection part with the first housing 17 of the second housing 18.

Figure 3:
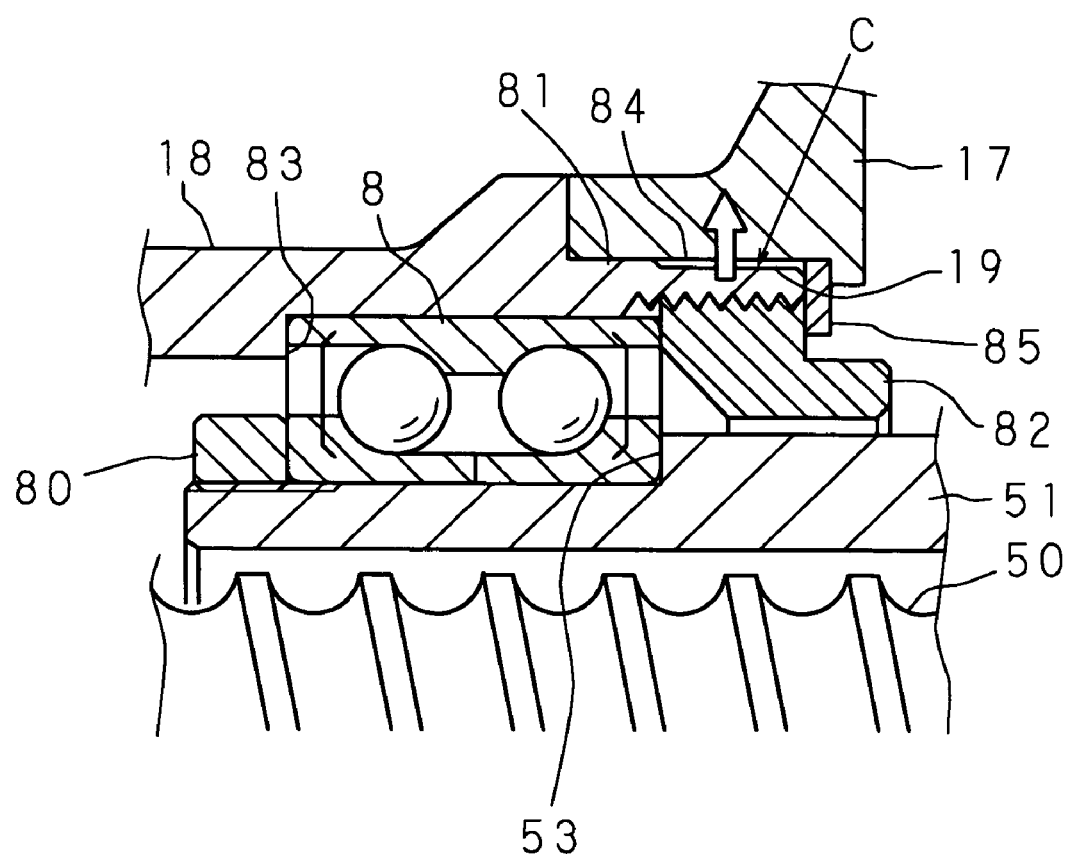
FIG. 3 is an enlarged sectional view near a retaining part of a thrust bearing.

A feature of the vehicle steering apparatus according to the present invention is the configuration of the retaining part of the thrust bearing 8 for supporting one side of the ball nut 51. FIG. 3 is an enlarged sectional view near the retaining part of the thrust bearing 8.

The thrust bearing 8 shown in this figure is a twin angular contact ball bearing constructed by employing a common outer race and back-to-back arrangement. An inner race fit onto one side of the ball nut 51 is tightened by a pre-load nut 80 screwed onto the outer periphery of an end part of the same side of the ball nut 51, thereby pressed against a stopper ring 53 attached around an outer periphery of a middle part of the ball nut 51, and thereby attached with a predetermined preload. Here, the thrust bearing 8 may be a twin angular contact ball bearing constructed by face-to-face arrangement, or alternatively may be composed of two angular contact ball bearings constructed by tandem arrangement. Further, a conical roller bearing as well as a ball bearing or a roller bearing of dedicated thrust use may be employed.

Retention of such a thrust bearing 8 in the rack housing 10 is performed as follows. That is, the outer race of the thrust bearing 8 is fit into the retaining ring (retaining part) 81 attached around an end part of the connection side with the first housing 17 of the second housing 18. Then, a fixing nut 82 screwed into the screw groove in the inner surface of the opening side of the retaining ring 81 is tightened to one side of the outer race, so that said outer race is pinched between the fixing nut 82 and a step 83 on the inner far side of the retaining ring 81.

Further, the outer periphery of the retaining ring 81 is used as a spigot-joint fitting part for connection with the first housing 17. That is, in the inner surface of an end part of the connection side with the second housing 18 of the first housing 17, a fitting part 19 is provided around along a predetermined length. Further, as shown in the figure, in the first and the second housings 17 and 18, the retaining ring 81 of the second housing 18 is fit into a fitting part 19 of the first housing 17, so that both housings 17 and 18 are linked with concentricity by the effect of the fitting part.

Here, in the outer periphery surface of the retaining ring 81 which is fit into the fitting part 19 by spigot-joint fitting, a small diameter part 84 is formed that is fabricated into a smaller diameter than other parts. As shown in the figure, the small diameter part 84 is provided such as to ensure a predetermined gap C between itself and the inner surface of the fitting part 19 along a length range approximately equal to the screwing region of the fixing nut 82 in the inner side starting from the tip part on the opening side of the retaining ring 81.

As described above, the fixing nut 82 is tightened such as to press the thrust bearing 8 fitted into and retained in the retaining ring 81 against the step 83 on the inner far side of the retaining ring 81 and thereby fix it in a manner unmovable in the axial direction. Thus, the fixing nut 82 receives a tightening reaction force from the thrust bearing 8 in association with the tightening. As indicated by an open-face arrow mark in FIG. 3, the tightening reaction force acts on the retaining ring 81 via a threaded part into which the fixing nut 82 is screwed, in such a manner as to increase the diameter of the spigot-joint fitting part of the outer periphery of the retaining ring 81. However, this increase in the diameter of the spigot-joint fitting part arises in the small diameter part 84 provided in correspondence to the screwing region of the fixing nut 82, and is hence absorbed within the range of the gap C between itself and the inner surface of the fitting part 19.

Accordingly, even when the fixing nut 82 is strongly tightened in order to fix the thrust bearing 8 firmly, a concern is avoided that a problem could arise in the connection of the first and the second housings 17 and 18 which is performed by fitting the retaining ring 81 of the second housing 18 into the fitting part 19 of the first housing 17 after the above-mentioned fixing. Further, concentricity of both housings 17 and 18 is ensured by the effect of the large diameter part remained in the pedestal end part of the retaining ring 81. On the other hand, the thrust bearing 8 fixed firmly can receive with a sufficient margin a thrust load exerted onto the ball nut 51.

The above-mentioned effect is realized by providing the small diameter part 84 in the outer periphery of the retaining ring 81 serving as a retaining part of the thrust bearing 8, without affecting the outer shape of the rack housing 10. This avoids the concern of a problem in the installation in a vehicle.

Further, in FIG. 3, the retaining ring 81 has been provided in the second housing 18. However, a retaining ring 81 may be provided in the first housing 17, while a fitting part 19 may be provided in the second housing 18. Then, both housings 17 and 18 may be linked to each other by spigot-joint fitting. Also in this case, when a small diameter part 84 is provided in the outer periphery of the retaining ring 81 so that a gap C is ensured in the spigot-joint fitting part, a similar effect is obtained obviously.

Further, the fixing nut 82 tightened at the stage of assembling can become loose by the effect of an external force exerted after the installation in a vehicle, so that looseness can arise in the fixing part of the thrust bearing 8 as time elapses. Further, the rack housing 10 is frequently fabricated from aluminum or aluminum alloy for the purpose of weight reduction. In this case, a problem arises that a difference in the thermal expansion coefficient between the retaining ring 81 and the fixing nut 82 accelerates the loosening in the fixing nut 82.

In the vehicle steering apparatus according to the present invention, in order that the above-mentioned loosening of the fixing nut 82 should be prevented that could arise as time elapses, an escape stopping ring 85 is inserted between the tip part of the retaining ring 81 and the fitting part 19 in a manner being in contact with the end face of the fixing nut 82. This contacting is realized such that a predetermined contacting state should be achieved after the tightening of the fixing nut 82 at the stage of assembling. Thus, the loosening of the fixing nut 82 that could arise as time elapses is alleviated by the insertion of the escape stopping ring 85.

Further, in order that the generation of looseness should be prevented that could be caused by the difference in the thermal expansion coefficient between the retaining ring 81 and the fixing nut 82, it is effective to employ different thread pitches in the threaded part in the inner periphery of the retaining ring 81 and in the threaded part in the outer periphery of the fixing nut 82. For example, when the thread pitch of the retaining ring 81 fabricated from aluminum having the larger thermal expansion coefficient is set up larger than the thread pitch of the fixing nut 82 having the smaller thermal expansion coefficient, the pitch difference becomes larger after thermal expansion and hence effectively prevents the generation of looseness. Here, when the thread pitches are changed, the tightening force necessary at the time of assembling increases. However, for example, when the thread pitch of the retaining ring 81 is set to be 1.5 while the thread pitch of the fixing nut 82 is set to be 1.4, the amount of increase in the tightening force is small and hence causes no concern of a problem in assembling.

A large bevel gear 6 serving as a driven gear is coaxially fit onto and fixed to the outer side of the ball nut 51 supported as described above. In the connection part between the support housing 15 and the rack housing 10, the large bevel gear 6 engages with the small bevel gear 4 provided at the tip part of the gear shaft 40.

The large bevel gear 6 is a resin gear in which at least the tooth part that engages with the small bevel gear 4 is fabricated from a resin material. This reduces engagement sound with the small bevel gear 4, and suppresses generation of metallic abrasion powder generated in the engage part with the small bevel gear 4. Further, the radial bearing 7 and the thrust bearing 8 that support both sides of the ball nut 51 as described above are shield bearings in which a metal-fabricated shield and a rubber-fabricated seal are provided on both sides of the balls serving as rolling elements, as shown in the figure. This shields the metallic abrasion powder generated in said engage part, and thereby prevents the power from entering into both bearings 7 and 8 and the rolling part of the balls 52, 52, . . . of the ball screw mechanism 5.

By virtue of the above-mentioned configuration, the rotation of the steering motor 3 extracted to the motor shaft 3*a* is transmitted to the ball nut 51 via the gear shaft 40, the small bevel gear 4, and the large bevel gear 6. Then, the rotation of the ball nut 51 in accordance with this transmission causes spiral motion of the screw groove formed in the inner periphery surface of the ball nut 51. This spiral motion is transmitted to the screw groove 50 formed in the outer periphery surface of the rack shaft 1 via a large number of the balls 52, 52, . . . , and then converted into displacement in the axial direction of the rack shaft 1, so that the above-mentioned steering is assisted.

The ball nut 51 that operates as described above receives a large thrust force in association with the above-mentioned motion conversion performed by the ball screw mechanism 5. However, the thrust bearing 8 that supports one side of the ball nut 51 has a sufficient thrust load capability by virtue of the retaining structure described above, and hence permits stable steering assistance operation.

The above-mentioned embodiment has been described in an example that the invention is applied to an electric power steering apparatus for transmitting the rotation of a steering motor 3 to a rack shaft 1 serving as a steering shaft in a vehicle provided with a steering mechanism of rack and pinion type. However, the present invention is applicable to an electric power steering apparatus of any type in a vehicle provided with a steering mechanism of a type other than the rack and pinion type, as long as the rotation of a steering motor is motion-converted and then transmitted to a steering shaft in the steering mechanism so that steering performed by displacement in the axial direction of the steering shaft is assisted.

Further, in the above-mentioned embodiment, a ball screw mechanism 5 has been employed in order to convert the rotation of the steering motor 3 into displacement in the axial direction of the rack shaft 1 serving as a steering shaft. Alternatively, another screw mechanism having a trapezoidal thread or the like may be employed. Further, a screw mechanism employing a bearing, a so-called bearing screw, may be used that is disclosed in Japanese Patent Application Laid-Open No. 2001-187955 and the like.

Further, in addition to the application to an electric power steering apparatus, the present invention is applicable to transmission from a steering motor to a steering shaft even in a separate type steering apparatus, a so-called steering-by-wire type steering apparatus, provided with a steering mechanism separated mechanically from a steering member so that steering is achieved solely by the rotation of a steering motor attached to a part of the steering mechanism. Also in this case, obviously, a similar effect is obtained.

The invention claimed is:

1. A vehicle steering apparatus comprising:
a housing for supporting, coaxially to a steering shaft, a rotating cylinder by a thrust bearing, said rotating cylinder being provided with a screw mechanism constructed between said rotating cylinder and said steering shaft for moving in an axial direction for the purpose of steering and being rotated by a transmission from a steering motor, said housing being constructed in a separated form having first and second housings, wherein the first housing is provided with a fitting part, and the second housing is provided with a retaining part, said retaining part having a first portion whose diameter is smaller than a diameter of a second portion thereof which secures concentricity of the first and second housing, and being configured to be fitted to the fitting part of the first housing by spigot-joint fitting;

wherein an interior surface of the fitting part is radially spaced from an exterior surface of the first portion of the retaining part, said interior surface of the fitting part and said exterior surface of the first portion of the retaining part together defining an absorbing gap, wherein a fixing nut is configured to be screwed into an interior surface of the retaining part in order to apply a tightening force on said thrust bearing from one side thereof, and said absorbing gap is configured to absorb an increase in an outer diameter of the first portion of the retaining part when the fixing nut is tightened into an interior surface of the first portion of the retaining part, and wherein said absorbing gap substantially overlaps, in the axial direction, with a screwing region between said retaining part and said fixing nut screwed into said retaining part.

2. The vehicle steering apparatus according to claim 1, wherein said screw mechanism is a ball screw mechanism and said ball screw mechanism is constructed such that a screw groove formed in an outer periphery of said steering shaft is engaged with a screw groove formed in an inner periphery of said rotating cylinder via a large number of balls.

3. The vehicle steering apparatus according to claim 1, further comprising an escape stopping ring, said escape stopping ring being in contact with an end face of said fixing nut from an opposite side of said thrust bearing.

4. The vehicle steering apparatus according to claim 1, wherein said thrust bearing is a twin angular contact ball bearing having a common outer race tightened by said fixing nut.

5. The vehicle steering apparatus according to claim 1, wherein said thrust bearing is a shield bearing provided with a shield member on both sides of rolling elements.

6. The vehicle steering apparatus according to claim 1, wherein said rotating cylinder has, in an outer periphery, a gear wheel that engages with a pinion of an output shaft of said steering motor.

7. The vehicle steering apparatus according to claim 6, wherein said gear wheel has resin gear teeth.

8. The vehicle steering apparatus according to claim 1, wherein a substantial amount of said absorbing gap overlaps, in the axial direction, with the screwing region between said retaining part and said fixing nut screwed into said retaining part, and an axial length of said absorbing gap substantially equals to an axial length of said screwing region.

* * * * *